April 12, 1932.   W. M. BRADSHAW ET AL   1,853,657
TESTING SYSTEM
Filed Dec. 24, 1927
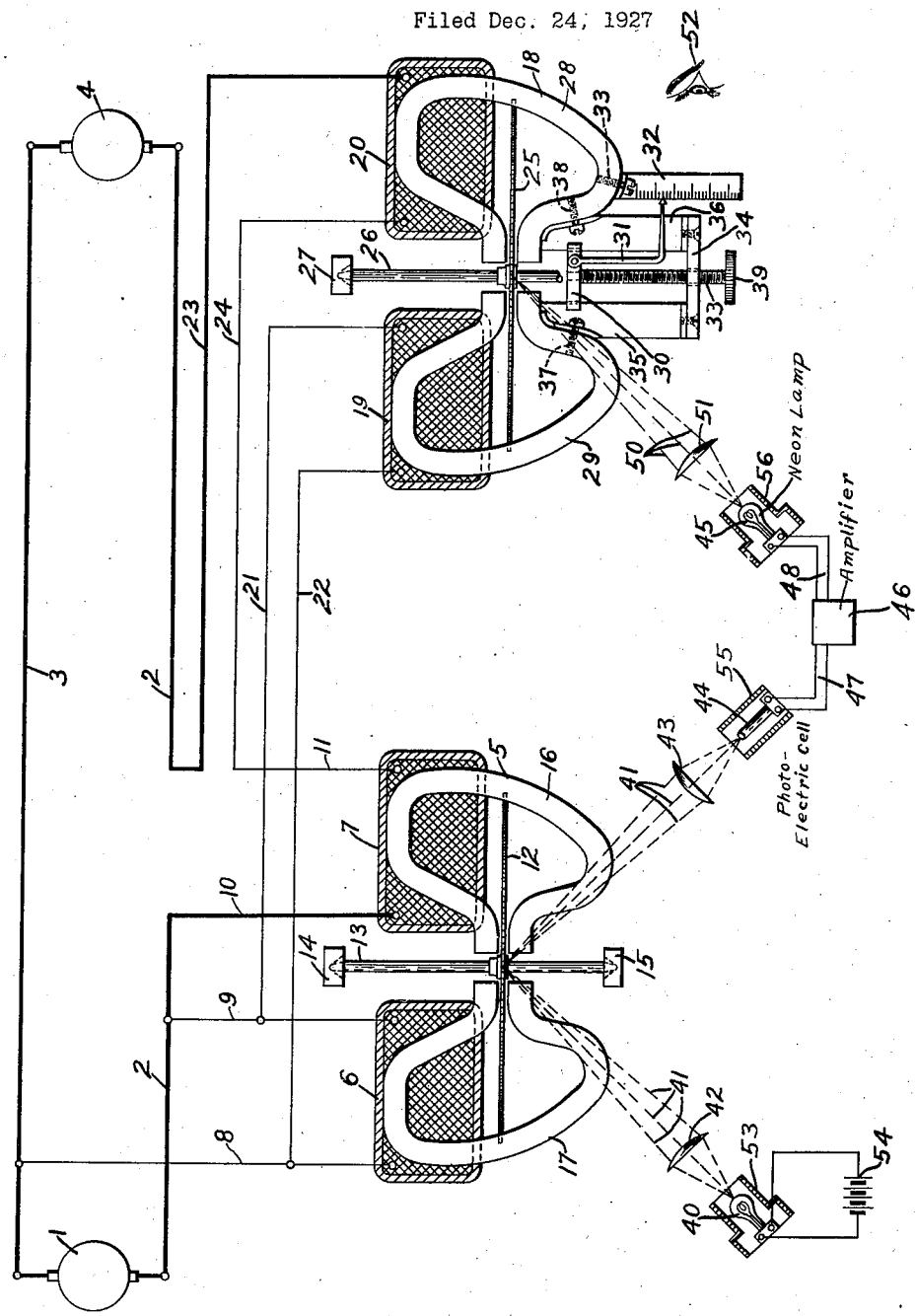
INVENTORS
William M. Bradshaw and
Argyle R. Rutter
BY
ATTORNEY Patented Apr. 12, 1932

1,853,657

UNITED STATES PATENT OFFICE

WILLIAM M. BRADSHAW, OF WILKINSBURG, AND ARGYLE R. RUTTER, OF EAST PITTSBURGH, PENNSYLVANIA, ASSIGNORS TO WESTINGHOUSE ELECTRIC AND MANUFACTURING COMPANY, A CORPORATION OF PENNSYLVANIA

TESTING SYSTEM

Application filed December 24, 1927. Serial No. 242,418.

Our invention relates to a testing system utilizable particularly for determining the accuracy of an electrical measuring instrument and more particularly a watthour meter.

Our invention has reference to stroboscopic means for calibrating and testing watthour meters and has a desirable application in connection with portable watthour meters that are used for checking the percent registration of watthour meters on the customer's premises.

Briefly speaking, our invention comprises a magnetizable keeper associated with the drag magnet of a standard meter for changing the speed of rotation of the standard watthour meter disc by shunting more or less of the flux intended to be cut by the disc. Such adjustable magnetizable keeper is provided with a scale that is preferably calibrated in the percent speed registration of the meter disc with respect to a predetermined speed.

In a preferred application of our invention the portable watthour meter is connected to the same source of supply as the meter whose registration is to be calibrated. Stroboscopic means are used to compare the speeds of rotation of the portable watthour meter disc and the test watthour meter disc. By changing the position of the magnetizable keeper with respect to the permanent magnet of the portable watthour meter with the aid of a micrometer screw, the speed of the standard watthour meter disc is adjusted to rotate in accordance with the speed of the test watthour meter disc. The percent speed registration of the test watthour meter disc is then conveniently read on the scale associated with the position of the magnetizable keeper.

For a more complete understanding of our invention in a preferred embodiment thereof, reference may be had to the accompanying drawing in which:

The single figure is a schematic representation of a portable watthour meter constructed in accordance with our invention in circuit relation with a watthour meter to be tested and a stroboscopic scheme for comparing the speeds of rotation of the two watthour meter discs.

A generator 1 supplies alternating current through conductors 2 and 3 to a suitable load, such as a motor 4. A watthour meter 5 comprising a voltage winding 6 and a current winding 7 is connected in electrical circuit relation with conductors 2 and 3 to measure the power transferred from the generator 1 to the motor 4 through the conductors 2 and 3. The voltage winding 6 of the watthour meter 5 is connected in parallel circuit relation with the conductors 2 and 3 by leads 8 and 9. The current winding 7 is connected in series circuit relation with the conductor 2 by leads 10 and 11.

Co-operating fluxes induced in the windings 6 and 7 are adapted to rotate a copper or aluminum disc 12 in the usual and well-known manner. The disc 12 is mounted on a spindle 13 that is provided with upper and lower bearings 14 and 15. The rotation of the disc 12 is damped in the usual manner by fluxes produced in the air gap between the poles of permanent magnets 16 and 17 so that the speed of rotation of the disc 12 is substantially proportional to the power traversing the conductors 2 and 3.

In ordinary operation, the watthour meter 5 is connected to the conductors 2 and 3 and registers the total amount of power that has traversed the conductors 2 and 3 from some predetermined time by means of an integrating mechanism (not shown) that is ordinarily geared to the spindle 13.

To the end that the rotative speed of the disc 12 may be checked against some standard of comparison, we place a watthour meter constructed in accordance with our invention in the same circuit as the watthour meter 5 and suitably adjust the speed of rotation of the standard watthour meter until it conforms with the speed of the watthour meter 5. The percent registration of the watthour meter 5 is read directly from a suitable calibrated scale associated with the speed adjusting means on the standard watthour meter.

The standard watthour meter 18 comprises the essential elements utilized in the watthour meter 5, its voltage and current windings 19 and 20 being connected to the conductors 2 and 3 in a manner similar to the connection of the voltage and current windings 6 and 7 of the watthour meter 5 to the conductors 2 and 3. The voltage winding 19 is preferably connected in parallel circuit relation with the conductors 8 and 9 by leads 21 and 22. The current winding 20 is preferably connected in series circuit relation with the conductor 2 by leads 23 and 24. In the example shown, the main current traversing the conductors 2 and 3 passes through the lead 10, the winding 7, the lead 11, the lead 24, the winding 20 and the lead 23 so that the same current that traverses the current winding 7 traverses the current winding 20.

The voltage windings 6 and 19 are in parallel circuit relation with the conductors 2 and 3, and therefore are equally energized therefrom. Fluxes from the current and voltage windings 19 and 20 actuate a disc 25 of the watthour meter 18. The disc 25 is mounted in a usual manner on a spindle 26 that is adapted to rotate between upper bearing 27 and a lower bearing (not shown). The spindle 26 may operate an integrating mechanism (not shown) in the usual and well-known manner. The disc 25 is adapted to rotate between the air-gaps between the poles of permanent magnets 28 and 29, the magnetic flux of which restrain the rotation of the disc 25.

In order to vary the speed of rotation of the disc 25 so that it may rotate in accordance with the speed of the disc 12 so that the percent registration of the meter may be readily determined, we associate an adjustable magnetizable keeper 30 with the permanent magnets 28 and 29. The magnetizable keeper 30 performs the function of a magnetic shunt and is adapted to cause a greater or less flux to cut the disc 25, depending upon the position of the keeper 30 with respect to the poles of the permanent magnets 28 and 29. The keeper 25 is provided with a pointer 31 that is preferably rigidly secured thereto. The pointer 31 coacts with or plays over a suitable calibrated scale 32 that, preferably, is mounted on the permanent magnet 28 by a screw 33, or the like. The magnetizable keeper 30 may be mounted on any suitable member, such as the casing of the portable watthour meter 18, but we prefer to mount the keeper 30 on a screw 33 that is threaded to a cross member 34 between brackets 35 and 36 that are secured preferably, by screws 37 and 38, to the permanent magnets 29 and 28, respectively. The screw 33 may be provided with a thumb piece 39 that may be readily turned to adjust the position of the member 30 with respect to the poles of the permanent magnets 28 and 29. The bracket members 35 and 36, preferably form guides for the movement of the magnetizable keeper 30. The threaded portion of the screw 33 provides a micrometer adjustment for the movement of the magnetizable keeper 30.

A single turn of the thumb piece 39 moves the keeper 30 a very short distance and the speed of the disc 25 may, therefore, be very accurately adjusted. The screw 33 is rotatably secured to the adjustable keeper 30 so that the keeper 30 may be moved in a substantially vertical direction by turning the thumb piece 39. The scale 32 is preferably calibrated in percent speed registration with respect to a predetermined speed. For example, for a predetermined position of the keeper 30, a point on the scale 32 may be marked as 100%. For speeds higher than 100%, as, for example, 101%, the keeper 30 would be closer to the poles of the magnets 28 and 29. For lower speeds, such as 99% registration, the keeper 30 would be farther away from the poles of the permanent magnets 28 and 29. In such manner, the scale 32 may be calibrated in terms of the percent speed registration of the disc 25 depending upon the position of the keeper 30 with respect to the poles of the permanent magnet.

The nearer the magnetizable member 30 is moved toward the poles of the permanent magnets 28 and 29, the more flux is shunted from the air-gap cut by the disc 25 and the faster the disc 25 tends to rotate. In a similar manner the farther away the magnetizable member 30 is from the poles of the permanent magnets 28 and 29, the less flux is shunted by the member 30 and the slower the disc 25 tends to rotate.

The speeds of the two discs 12 and 25 may be compared in any suitable manner, as for example, by a stroboscopic system. A stroboscopic method of comparing the speeds of the two discs may comprise, for example, light beams that co-operate with marks placed upon the periphery of the discs 12 and 25. Such marks comprise alternate light absorbing and light reflecting surfaces. Means for properly directing light rays between the two discs may comprise a source of light, such as a lamp 40 whose rays 41 project through a lens 42 to the periphery of the disc 12. The rays 41 are reflected from the reflecting portions of the periphery of the disc 12 through a lens 43 that concentrates them on a photoelectric cell 44.

The photoelectric cell 44 acts as a circuit closing relay and is adapted to light a lamp 45, such as a neon gas lamp, every time light is flashed on the cell 44. The cell 44 may cause the lamp 45 to light in any suitable manner, as, for example, by means of an amplifier 46. Every time the photoelectric cell 44 closes the circuit, a current traverses the circuit 47. Such current is amplified and traverses the circuit 48, lighting the lamp 45. Light rays 50 from the neon lamp 45 are directed through a lens 51 to the periphery of the disc 25. The eye 52 of the observer may be placed in the position shown to observe the stroboscopic effect of the light rays 50 with the alternate light absorbing and light reflecting surface on the periphery of the disc 25.

The lamp 40, that is the original source of light rays, is energized in any suitable manner, as for example, by a battery 54. The lamp 40 is preferably provided with an enclosing shade 53. The photoelectric cell 44 and the lamp 45 may also be provided with shades 55 and 56, respectively.

A desirable device for testing the operation of the watthour meter 5 would comprise a unitary casing comprising the light rays system and the portable watthour meter 18. With such assembly, the watthour meter 5 may be readily tested by placing the assembled testing device in proximity to the watthour meter 5. It is a simple matter to connect the terminals of the portable watthour meter 18 in circuit relation with conductors 2 and 3, and the speed of rotation of the disc 25 may be readily adjusted to rotate in accordance with the speed of the watthour meter disc 12 by turning the thumb piece 39 in the proper direction. When the speed of rotation of the disc 25 is equal to the speed of rotation of the disc 12, the percent speed registration of the watthour meter disc 12 with respect to its standard speed regulation may be readily determined from the position of the pointer 31 on the scale 32.

We do not wish our invention to be limited by the system herein disclosed, but we desire that it shall include all testing and calibrating applications to which such a device may be put. We wish it understood that our invention resides particularly in the adjustable magnetizable keeper 30 that is provided with a calibrated scale 32. The scale 32, of course, may be calibrated in any function of the speed of the disc 25, i. e., it may be calibrated in present registration, or in the actual number of turns made by the disc 25, if the latter were operated by a constant source of supply.

Various changes and modifications may be made in our invention without departing from the spirit and scope thereof, as set forth in the appended claims.

We claim as our invention:

1. The combination with a plurality of integrating meters, of means for stroboscopically comparing the speeds of the rotating elements of said meters, means for adjusting the speed of the rotating element of one of said meters to conform to the speed of the rotating element of another of said meters including a magnetizable keeper associated with the flux-damping system of said one meter, and a calibrated scale for said keeper.

2. The combination with a plurality of integrating meters, of means for stroboscopically comparing the speeds of rotating elements of said meters, means for adjusting the speed of the rotating element of one of said meters to conform to the speed of the rotating element of another of said meters, said adjusting means comprising a movable magnetizable keeper for changing the flux damping of said one meter and a calibrated scale for said keeper.

3. In combination, a plurality of elements movable in response to a common influence, means for varying the movement of one of said elements, and means responsive to operation of said varying means for giving a direct indication of a difference between the movement of another of said elements and said one element.

4. In combination, a plurality of elements capable of different movements in response to a common influence, one of said elements operating as a standard to move at a given rate in response to a given influence, and means for varying the rate of the standard element to agree with the movement of another of said elements in response to a given influence, and means responsive to operation of said varying means for giving a direct indication of the departure of movement of said other element from the movement of the standard element.

5. In combination, a plurality of elements movable in response to a common influence, one of said elements being the armature of a watthour meter, flux-damping means for changing the speed of said armature, and means associated with said damping means for indicating the percent ratio of the speed of said armature to the speed of another of said elements.

6. In combination, a plurality of elements movable in response to a common influence, one of said elements being a rotatable conductor, a permanent magnet for braking said conductor, an adjustable magnetizable shunt associated with said magnet for changing the braking effect of said magnet on said conductor, a pointer movable in response to movement of said shunt and a scale for the pointer calibrated in terms of the speed of said conductor.

In testimony whereof, we have hereunto subscribed our names this 15th day of December, 1927.

WILLIAM M. BRADSHAW.
ARGYLE R. RUTTER.

DISCLAIMER 1,853,657.—*William M. Bradshaw*, Wilkinsburg, and *Argyle R. Rutter*, East Pittsburgh, Pa. TESTING SYSTEM. Patent dated April 12, 1932. Disclaimer filed April 19, 1932, by the assignee, *Westinghouse Electric and Manufacturing Company*.

Hereby enters this disclaimer to that part of the claim in said specification appearing as claims 3 and 4 of the aforesaid Letters Patent No. 1,853,657.

[*Official Gazette May 10, 1932.*]